United States Patent [19]

Ferree

[11] Patent Number: 4,921,432

[45] Date of Patent: May 1, 1990

[54] WIRE CONDUCTING ROTARY COUPLING EMPLOYING PROTECTIVE SKIRT

[75] Inventor: Herbert E. Ferree, Hempfield Twp., Westmoreland Co., Pa.

[73] Assignee: Space Industries Partnership, L.P., Webster, Tex.

[21] Appl. No.: 257,919

[22] Filed: Oct. 14, 1988

[51] Int. Cl.⁵ .......................................... H01R 35/04
[52] U.S. Cl. .................................. 439/164; 439/162; 439/13
[58] Field of Search ..................... 439/13, 15, 16, 162, 439/164

[56] References Cited

U.S. PATENT DOCUMENTS

| | | | |
|---|---|---|---|
| 2,702,889 | 2/1955 | Bareford | 439/164 |
| 3,157,451 | 11/1964 | Martini | 439/162 |
| 3,433,889 | 6/1966 | DeVries, Jr. | 174/69 |
| 3,792,189 | 2/1974 | Stengel et al. | 174/69 |
| 4,542,858 | 9/1985 | Manges | 242/54 R |
| 4,804,331 | 2/1989 | Eguchi et al. | 439/162 |

OTHER PUBLICATIONS

One Page Description of Lockhee, "Twist Flex Concept".

Primary Examiner—Gary F. Paumen
Attorney, Agent, or Firm—Venable, Baetjer and Howard

[57] ABSTRACT

A rotary coupling for conducting rotational movement across a plurality of electrical wires is disclosed herein which applies a minimum amount of stress on the wires. The coupling generally comprises first and second concentrically disposed tubular members rotatably movable with respect to one another and a skirt member circumscribing one of the tubular members which defines a recess for receiving U-shaped slack portions present in each of the wires. In operation, the U-shaped slack portions extend into and retract out of the recess whenever the coupling members are rotated relative to one another. The rotary coupling effectively transmits torque and high electrical currents in environments where the use of slip rings is undesirable, such as outer space, and is particularly useful within a movable support arm which connects a solar panel to the main body of a space facility.

30 Claims, 4 Drawing Sheets

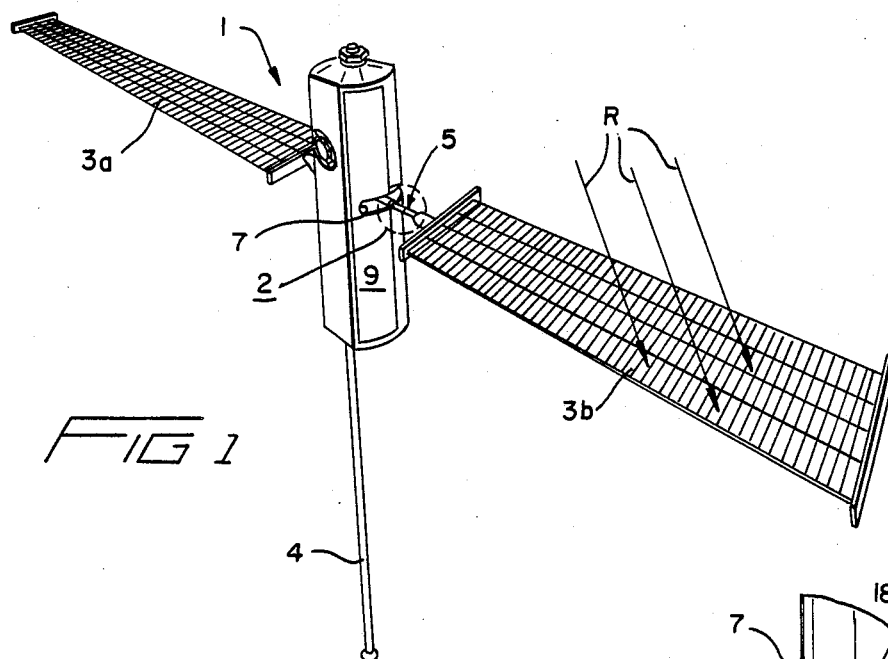
FIG 1
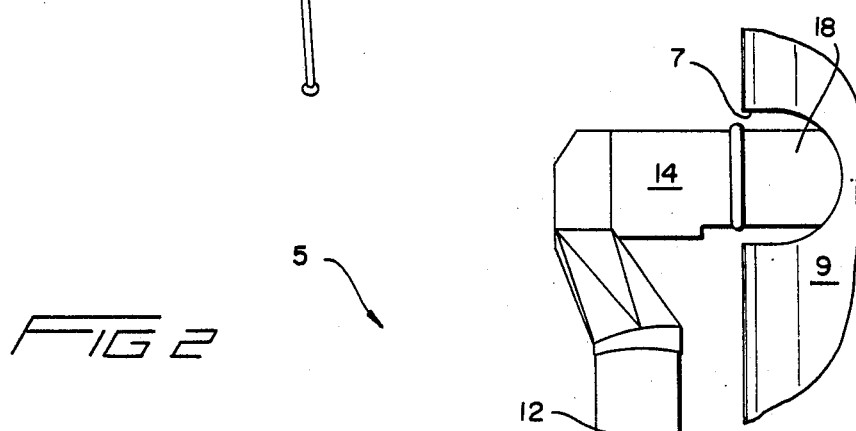
FIG 2
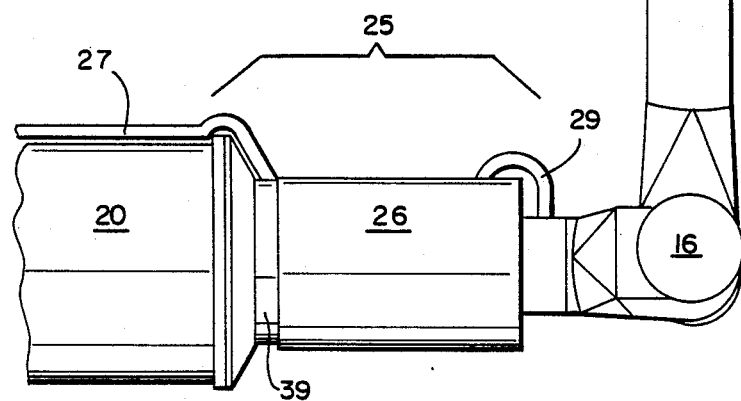

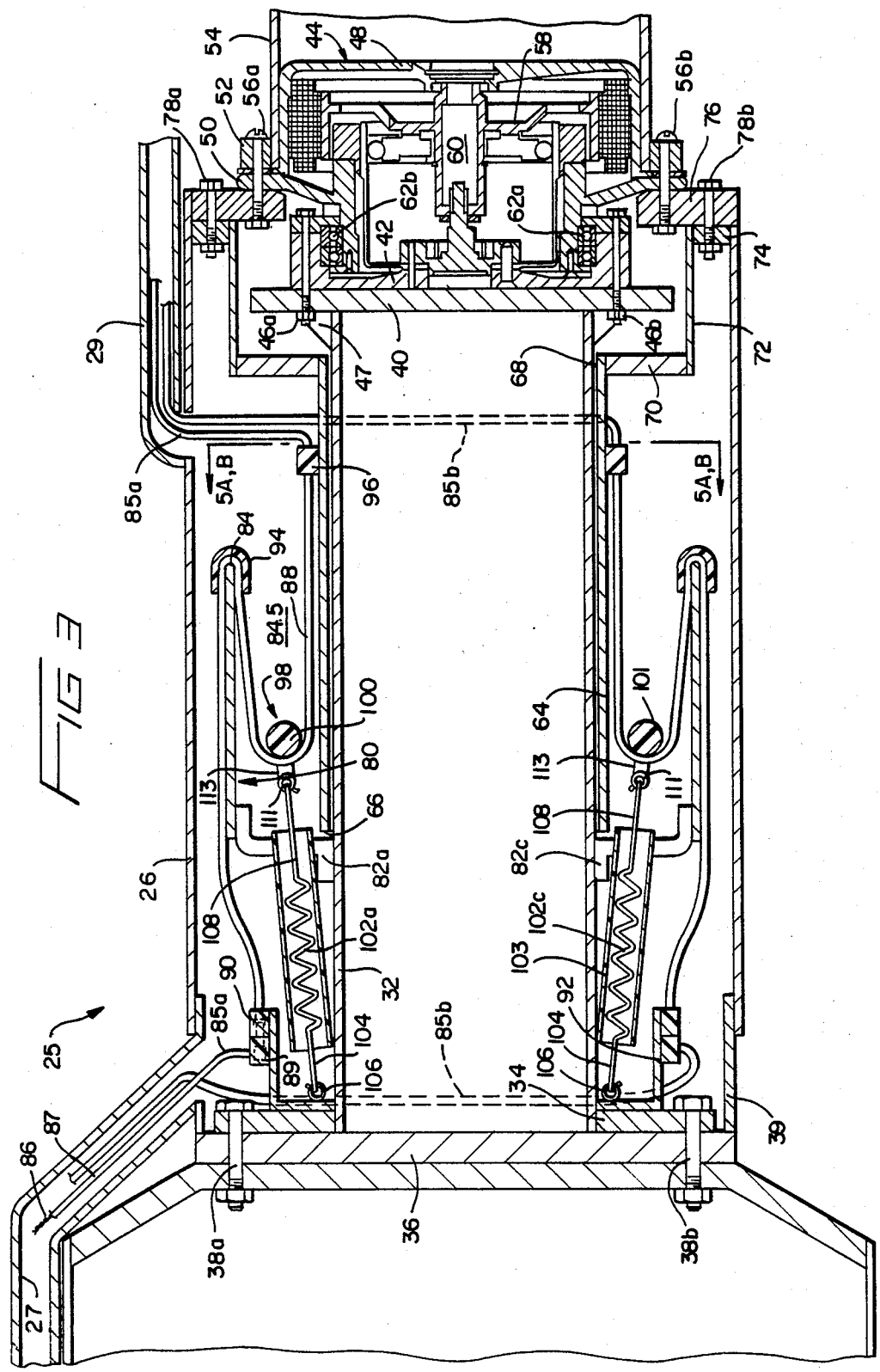

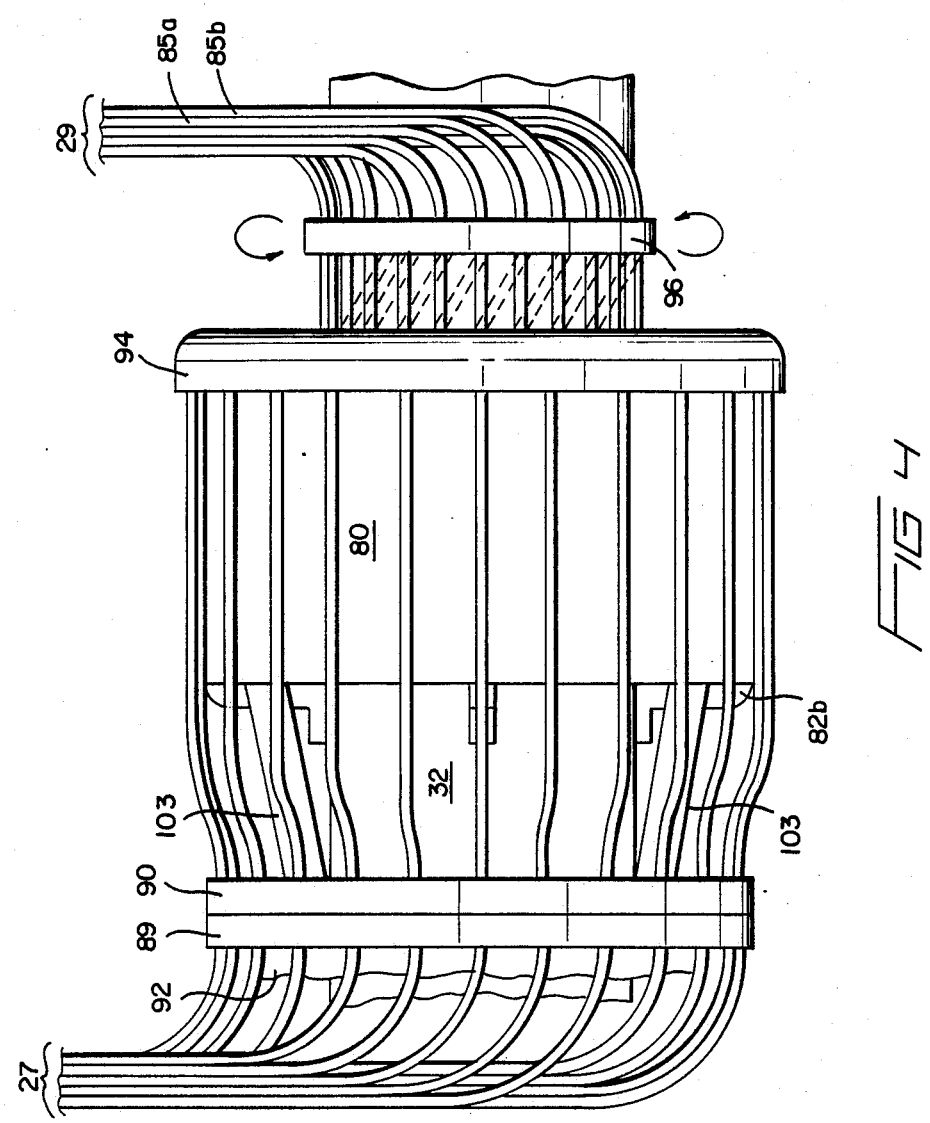

WIRE CONDUCTING ROTARY COUPLING EMPLOYING PROTECTIVE SKIRT

BACKGROUND OF THE INVENTION

This invention generally concerns a coupling for conducting both rotational movement and electrical current without the use of slip rings, and is specifically concerned with a coupling that conducts rotational movement across a plurality of electrical wires while applying a minimum amount of stress on the wires.

Rotary couplings for allowing rotational movement across an array of electrical wires are known in the prior art. Such couplings find particular use in space applications, where telecommunication or electrical power currents must be transmitted over movable joints in satellites, such as the joints in the support arms which connect a panel of solar cells to the main body of the satellite. Because the orientation of such solar panels must be constantly adjusted to maintain the cells in a perpendicular orientation with respect to the rays of the sun, the rotatable joints in such support arms must be capable of repeatedly rotating the panels 180 degrees to and fro while transmitting the electric power generated therefrom into the satellite body in a completely reliable manner. Slip rings have generally proved to be unsuitable for such power transmission in the vacuum of space, as the high currents conducted through such slip rings tend to generate undesirable amounts of electromagnetic interference when the rings are rotated. Consequently, wire-conducting rotary joints have been constructed with the hope of achieving a rotary coupling capable of at least 180 degree movement in both a clockwise and counterclockwise direction without the application of bending stresses on the wires passing therethrough which would cause these wires to either break or to short circuit.

One such wire conducting coupling is disclosed in U.S. Pat. No. 4,542,858. This design comprises a pair of relatively movable ring-type structures having plus or minus 180 degree relative rotation. The ring structures are interconnected by, inter alia, a pair of concentrically coiled metal bands which resemble internesting watch springs. Electrical wires traversing the two ring-type structures are disposed between the two inter-nesting coiled metal bands. Sufficient slack is allowed in the portion of the wires captured between the two coiled metal bands so that little stress is applied to these wires when the coiled metal bands are wound tighter or looser due to rotational movement. In another design known in the art as a "twist-flex" coupling, two disc-like members are rotatably interconnected by means of an axially disposed shaft. A plurality of electrically conductive wires axially disposed with respect to the shaft are connected around the circumference of each of the circular members. Sufficient slack is incorporated into each of the wire segments disposed between the two circular members so that the outline of the structure generally resembles an hourglass. The wires remain spaced apart and parallel with respect to one another even when the two circular members are twisted with respect to one another, the only difference being that when some of the slack is pulled out of each of the wires due to rotation, the wires go from a parallel to an oblique orientation with respect to the longitudinal axis of the shaft of the coupling.

The demands made upon such wire-conductive, rotary couplings can be considerable. For example, in the orbiting industrial space facility in the planning stages at the Westinghouse Electric Corporation, such couplings must be able to handle 200 or more 16 gauge wires for over 65,000 cycles between limits of plus and minus 180 degrees over ten years without breakage due to flexing. Moreover, such a coupling should take up a minimum of space and weight, and should be able to perform its task without requiring any undue lengthening of the wire segments which traverse it which would result in unwanted electrical resistance. Unfortunately, neither of the aforementioned prior art designs completely fulfills these criteria. Rotary couplings utilizing concentrically coiled metal bands as previously described are not well suited to handle large numbers of thick wire strands. While it is conceivable that the prior art designs of such couplings might be modified to handle greater numbers of electrical wires, such modifications would increase both the size and the weight of the unit as a whole, thereby defeating one of the primary design objectives of the coupling. Additionally, the confinement of the wires between the metal bands impedes the ability of the coupling to safely dissipate the heat generated by the wires by virtue of electrical resistance. While the "twist flex" prior art design does have the ability to handle the number and type of wires necessary to conduct the current generated by a large panel of solar cells, the amount of slack wire required between the two circular members results in significant power losses. Additionally, the slack wire in the wire segments of such couplings has a great deal of freedom of movement which increases the likelihood that a particular wire segment could snag a component or become entangled with other segments within the rotary coupling and break.

Clearly, there is a need for a wire conducting rotary coupling which is free of the shortcomings of the prior art, and capable of conducting a large number of heavy gauge wires in a relatively stress free manner in a structure which is both compact and lightweight. Ideally, such a coupling should require only very short amounts of slack wire to perform its function so as to minimize power losses. Finally, it would be desirable if the wire segments in such a coupling were arranged so as to maximize radiative heat losses, configured so as to provide a maximum amount of protection against micrometeorites, and include a means for closely controlling the movement of the slack portions of the wire segments so as to minimize the probability of any such slack portion from snagging or entangling within the coupling and breaking.

SUMMARY OF THE INVENTION

Generally speaking, the invention is a rotary coupling for conducting rotational movement across a plurality of electrical wires with a minimum of stress which achieves all of the aforementioned objectives. The invention comprises first and second coupling members rotatably connected together, a skirt member circumscribing one of the coupling members for defining a recess for receiving slack portions of a plurality of flexible electrical wires which are uniformly connected around the circumference of the first and second coupling members and axially aligned therewith. In operation, the slack portions of each of the wires extend into and retract out of the recess as the coupling members are rotated relative to one another clockwise and counterclockwise, respectively.

The invention may further include a wire retaining assembly for retaining the slack portions of the wires within the recess. The wire retaining assembly may include a retaining ring which is resiliently drawn into the wire receiving recess of the skirt member by means of at least three tensioning springs. The springs are selected so that the pressure applied by the retaining ring amounts to only two ounces per wire which is enough to retain the wire in a desired position without applying significant stress or friction to it. To minimize friction between the retaining ring and the slack portions of the wires, both the wires and the outer surface of the ring are coated with a fluorocarbon insulating material which is both self-lubricating and electrically insulative, such as Teflon ®.

The coupling members may be tubular in shape, and the first coupling member may be concentrically disposed within the second coupling member. The skirt member may have mounting brackets around one edge which is connected around the first coupling member, and a free edge which is circumscribed by a grommet which serves to both mount and uniformly space the slack portions of the wires therearound. Additionally, spacing rings for uniformly spacing the wire segments apart from one another may be placed around the ends of both the first and second coupling members so that the slack portions always remain parallel to one another as the first and second coupling members are moved. Finally, a tubular housing may be provided around the first and second coupling members in order to shield the wire segments contained therein from exposure to both micrometeorites and atomic oxygen.

The resulting configuration is compact, lightweight, and requires only minimal lengths of slack wire in order to operate, thereby minimizing power losses. The power losses that are generated by virtue of electrical resistance are easily dissipated by the uniform, peripheral spacing of the wire which provides excellent radiative heat loss characteristics, as well as easy access to any of the wire segments should repairs become necessary.

BRIEF DESCRIPTION OF THE SEVERAL FIGURES

FIG. 1 is a perspective view of an orbiting industrial space facility having a generally cylindrical housing, and a pair of solar panels connected thereto by means of articulated joint assemblies where the rotary coupling of the invention finds particular use;

FIG. 2 is an enlarged side view of an articulated joint assembly which incorporates the rotary coupling of the invention;

FIG. 3 is a cross-sectional side view of the rotary coupling illustrated in FIG. 2;

Figure 5A:
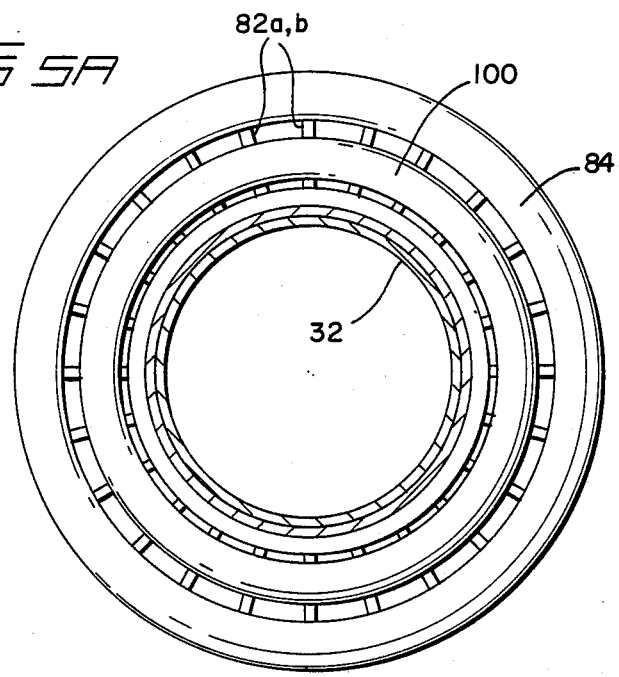
Figure 5B:
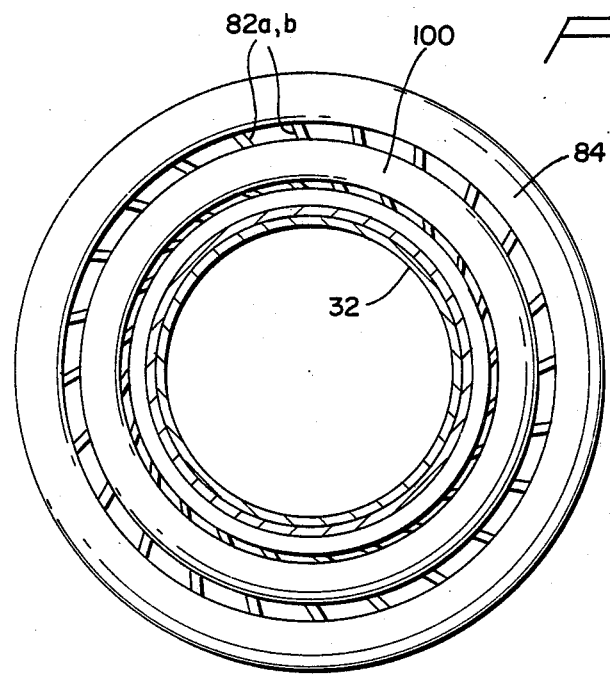

FIG. 4 is a side view of the rotary coupling shown without the housing that normally surrounds it, illustrating how the insulating ring and electrical connector rings circumscribing either end of the coupling members coact with the skirt grommet to maintain a uniform spacing between the wire segments even when the coupling members are rotated with respect to one another, and FIGS. 5A and 5B are cross-sectional end views of the coupling along the line 5A,B in FIG. 3, illustrating the movement of the wire segments when the coupling members are moved with respect to one another.

DETAILED DESCRIPTION OF THE PREFERRED EMBODIMENT

With reference now to FIGS. 1 and 2, wherein like figures designate like components throughout all the several figures, the invention finds particular utility in conjunction with an orbiting industrial space facility 1. Such a facility generally includes a pair of opposing solar panels 3a, 3b projecting from its sides, and a stabilizing boom 4 at one end. Articulated joint assemblies 5 connect the solar panels 3a, 3b to the main body of the facility 1 by way of a slot 7 disposed in its generally cylindrical housing 9. As may best be seen in FIG. 2, each of the joint assemblies 5 includes a support arm 12 having pivot joints 14 and 16 at its proximal and distal ends, respectively. The proximal pivot joint 14 connects the support arm 12 to a support member 18 which forms part of a frame (not shown) disposed within the housing 9 of the facility 1. The distal pivot joint 16 connects the distal end of the support arm 12 to a solar array canister 20 by way of the rotary coupling 25 of the invention. With reference now to FIG. 2, the rotary coupling 25 includes a cylindrical housing 26 which receives, on its distal end, a power cable 27 that is comprised of over 200 sixteen gauge wires bunched together, each of which is connected to one of the solar cells mounted on the solar panels 3a, 3b. As will be described in greater detail hereinafter, the plurality of wires that comprise the power input cable 27 are spread apart at the distal end of the coupling 25 and uniformly spaced around the peripheries of the various circular elements contained within the cylindrical housing 26, and are regathered near the proximal end of the coupling 25 to form power outlet cable 29. The power outlet cable 29 extends through the interior of the articulated joint assembly 5 and on through the frame member 18 where it may be used to power the various components within the industrial space facility 1. It should be noted that cylindrical housing 26 acts as a micrometeorite shield that protects all of the wires and components disposed within the coupling 25.

As the space facility 1 orbits the earth, it is necessary for each of the solar panels 3a, 3b to continuously maintain a relatively perpendicular orientation with respect to the rays of the sun (which are designated by the arrow R). Failure to maintain such a perpendicular orientation will, of course, result in a loss of power output from the solar panels 3a, 3b. To this end, the articulated joint assembly 5 must continuously rotate the solar array canister 20 to and fro with respect to the distal pivot joint 16. As such a space facility 1 is designed to last over ten years, it is estimated that the rotary coupling 25 will have to perform over 65,000 rotational cycles if the solar panels 3a, 3b are to be maintained in a proper, power generating orientation. While adjustments to the orientation of the panels 3a, 3b may also be made by moving the proximal and distal pivot joints 14 and 16, the preferred movement for maintaining proper orientation of the panels 3a, 3b is rotation of the arm 12 at coupling 25.

With reference now to FIG. 3, the rotary coupling 25 is generally formed from a torque tube 32 for transmitting the torque generated by a rotary incremental actuator 44 to the solar array canister 20, and a wrap tube 64 which is concentrically disposed around the torque tube 32 for maintaining a proper axial alignment and spacing between the individual wires 85a, 85b which form the power output and input cables 27 and 29. The torque tube 32 is rotatably movable with respect to the wrap tube 64 as will become more evident presently. A skirt member 80 circumscribes the torque tube 32 and defines a wire receiving recess 84.5 for receiving slack portions 88 of the wires 85a, 85b. While only two of the wires 85a, 85b have been given reference numerals in FIG. 3, the actual number of wires forming the cables 27 and 29 is over 200.

At its distal end, the torque tube 32 includes a driven flange 34 which is connected to an end wall assembly 36 of the solar array canister 20 by means of mounting bolts 38a, 38b. In the preferred embodiment, the torque tube 32 is preferably formed from aluminum approximately 0.25 inches thick. To protect the ends of the wires 85a, 85b surrounding the distal end of the torque tube 32 from micrometeorites, a housing sleeve 39 is provided around the perimeter of the canister end wall 36 as shown. The free edge of this sleeve 39 extends under the distal edge of the cylindrical housing 26 so as to give no straight line path for micrometeorites to enter the coupling 25. At its proximal end, the torque tube 32 includes a drive flange 40 which is connected to the circular output member 42 of the previously mentioned rotary incremental actuator 44 by mounting bolts 46a, 46b. Reinforcing gussets 47 strengthen the connection between the drive flange 40 and output member 42. The motor housing 48 of the rotary incremental actuator 44 is circumscribed by a mounting flange 50 which is connected to an annular flange 52 present around the distal edge of the tubular output member 54 by screws 56a, 56b. The tubular output member 54 is in turn integrally formed with the distal pivot joint 16. From the foregoing description, it is evident that when the rotary incremental actuator 44 is actuated to turn the output member 42 and drive flange 40, the solar array canister 20 is turned while the tubular output member 54 remains stationary.

The rotary incremental actuator 44 includes a motor rotor 58 which in turn is connected to a centrally disposed and axially aligned shaft 60 connected to the output member 42 at its distal end. Output bearing 62 maintains the output member 42 (and hence the drive flange 40 and the torque tube 32) in concentric alignment within the tubular housing 26 of the coupling 25 during rotation. In the preferred embodiment, the rotary incremental actuator 44 is a Type 5 actuator manufactured by the Schaeffer Magnetics Corporation located in Chatsworth, Calif. 91311.

The wrap tube 64 includes both a free distal edge 66 and a proximal edge 68. The proximal end 68 is connected to an annular mounting member 70. The mounting member 70 is connected around the distal edge of a mounting sleeve 72 whose proximal edge is circumscribed by an annular shoulder 74. This shoulder 74 is in turn connected around the edge of a mounting ring 76 which, like the previously described annular flange 52, is secured around the mounting flange 50 of the rotary incremental actuator 44.

The skirt member 80 circumscribes both the torque tube 32 and the wrap tube 64 as shown. The skirt member 80 includes three 120 degree spaced mounting brackets 82a, 82b and 82c on one end for securing the skirt member 80 in concentric relationship around the torque tube 32 such that an annular recess is formed between the inner surface of the skirt member 80 and the outer surface of the wrap tube 64. The skirt member 80 terminates in a free edge 84 as shown, and defines a wire-retaining recess 84.5 between its inner surface and the outer surface of the torque tube 32.

The wires 85a, 85b which form the previously mentioned input and output power cables 27 and 29 each comprise sixteen gauge silver plated strands 86 of copper wire to maximize flexibility. Additionally, each of the wires 85a, 85b is covered with a layer of insulation 87 formed from a nonvolatile fluorocarbon plastic having a broad temperature tolerance. In the preferred embodiment, the insulation 87 is a layer of Teflon ® approximately 5 to 10 mils thick having an insulation rating of at least 1,000 volts. As is best seen with respect to both FIGS. 3 and 4, the wire members 85a, 85b each include a slack portion 88 which is folded in a U-shape within the annular recess defined between the inner wall of the skirt member 80 and the outer wall of the wrap tube 64. Each of the wires 85a, 85b is connected at the distal end of the torque tube 32 by way of the male and female electrical connector rings 89 and 90. As is best seen in FIG. 4, these connector rings 89, 90 uniformly distribute the wires 85a, 85b around the circumference of the skirt member 80. The provision of such electrical connector rings 89 and 90 not only serves to mount one end of the wires 85a, 85b around the skirt 80; they also facilitate the repair or replacement of any particular wire should this become necessary. The male and female electrical connector rings 89 and 90 are offset away from the outer wall of the torque tube 32 by means of a mounting flange 92 in order to provide space for the tensioning springs 102a–102c which will be discussed in more detail later.

A spacing grommet 94 is engaged around the free edge 84 of the skirt member 80 as shown. The spacing grommet 94 firmly mounts one end of the slack portions 88 of the wires 85a, 85b around the free end of the skirt member 80, and further serves to uniformly space the wires 85a, 85b apart as may best be seen in FIGS. 4, 5A and 5B. The wires 85a and 85b are also mounted within the rotary coupling 25 around the proximal end of the wrap tube 64 by means of insulating spacing ring 96. The insulating spacing ring 96 anchors the other end of the U-shaped slack portion 88 of each of the wires 85a, 85b in such a manner so as to encourage it to remain within the recess defined by the skirt member 80, and further equidistally mounts and spaces these wires around the circumference of the wrap tube 64.

In the preferred embodiment, a wire retaining assembly 98 is provided to insure that the U-shaped slack portions 88 of each of the wires 85a, 85b remain within the annular recess of skirt member 80. The wire retaining assembly includes a retaining ring 100 having a circular cross section as shown. In the preferred embodiment, retaining ring 100 is formed from an inert plastic material such as polyurethane. The outer surface of the ring 100 includes a coating 101 of a self-lubricating plastic, such as Teflon ®, to minimize the friction generated when the ring 100 engages the inner surface of the U-shaped slack portions 88 of the wires. The wire retaining assembly 98 further includes at least three tensioning springs 102a–102c equidistantly arranged at 120 degree angles around the perimeter of the torque tube 32 for applying a uniform biasing force on the ring 100 which causes it to resiliently engage the inner surface of the U-shaped slack portions 88 of the wires 85a, 85b. The proximal end 104 of each of these springs 102a–102c is fastened around an eyelet 106 at the base of the previously described mounting flange 92, while the distal end 108 extends through a 110 degree slot between two of the brackets 82a, 82b, 82c mounting the skirt member 80 to the eyelet 111 of an anchor lug 113 connected to the retaining ring 100. Each of the springs 102a-102c is preferably covered by a thin, rigid tube 103 of a heat resistant fluorocarbon plastic such as Teflon ® to prevent the coils of these springs from catching or binding on the edges of the slots. In the preferred embodiment, each of the anchor lugs 113 is integrally formed out of the same polyurethane material that forms the retaining ring 100. Additionally, the tensile force of each of the springs 102a, 102b, 102c is chosen so that the ring 100 applies only about 2 ounces of force onto the slack portion 88 of each of the individual wires 85a, 85b. Thus if three springs are used to retain 200 wires, each spring should apply a tensioning force of about 8.375 lbs. The application of a 2 ounce force on each wire 85a, 85b should be enough to keep the wires in alignment without overstressing them or abrading through their insulation 87.

The operation of the rotary coupling 25 is best understood with respect to FIGS. 4, 5A and 5B. When the torque tube 32 is not rotated relative to the wrap tube 64, the wires 85a, 85b are maintained in a parallel disposition with respect to the longitudinal axis of the torque tube 32. When, however, the rotary incremental actuator 44 applies a torque to the torque tube 32 incident to reorienting one of the solar panels 3a, 3b connected to one of the solar array canisters 20, the wires 85a, 85b assume the twisted, parallel configuration illustrated in FIGS. 4, and 5B. The extra length of wire necessary to assume such an oblique orientation is supplied by the slack portion 88 of each of the wires 85a, 85b. However, despite such movement of the slack portions 88 of the wires 85a, 85b, a perfectly uniform spacing is maintained by means of the male and female electrical connector rings 89, 90 working in concert with the spacing grommet 94, the insulating spacing ring 96, and the retaining ring 100 which applies just enough force to the inner surface of each of the the U-shaped slack portions 88 of the wires 85a, 85b to insure that they will not flex over one another or become entangled with another component of the coupling 25.

I claim:

1. A rotary coupling for allowing rotational movement across a plurality of electrical wire means while applying a minimum amount of stress on said wire means, comprising:
    first and second coupling members rotatably connected together,
    a skirt member circumscribing one of said coupling members for defining a wire receiving recess around said one coupling member, and
    a plurality of flexible electrical wire means traversing said first and second coupling members, each said wire means including a slack portion disposed in said wire receiving recess,
    wherein said slack portions are extended into and retracted out of said recess as said coupling members are rotated relative to one another in first and second directions, respectively.

2. The rotary coupling defined in claim 1, further comprising means for retaining said slack portions within said recess.

3. The rotary coupling defined in claim 2, wherein said means includes a retaining member for engaging said slack portions.

4. The rotary coupling defined in claim 3, wherein said retaining means includes at least one spring means for biasing said retaining member into said recess.

5. The rotary coupling defined in claim 1, further comprising a housing means for housing said first and second coupling members and said flexible electrical wire means.

6. The rotary coupling defined in claim 1, further comprising spacing ring means for mounting said flexible electrical wire means around said first and said second coupling members.

7. The rotary coupling defined in claim 1, wherein each of said flexible electrical wire means includes first and second end portions, and wherein said rotary coupling further comprises first and second spacing ring means circumscribing said first and second coupling members, and connected to the first and second end portions of the flexible electrical wire means for uniformly spacing said wire means around the outer surface of said first and second coupling members.

8. The rotary coupling defined in claim 3, wherein said first and second coupling members are each tubular in shape, and wherein one coupling member is concentrically disposed around the other.

9. The rotary coupling defined in claim 8, wherein said retaining member is a retaining ring.

10. The rotary coupling defined in claim 1, wherein said skirt member includes a free edge, and spacing means around its free edge for uniformly spacing and mounting said electrical wire means therearound.

11. A rotary coupling for allowing rotational movement across a plurality of electrical wire means while applying a minimum of stress on said wire means, characterized by:
    first and second tubular coupling members concentrically disposed within and rotatable with respect to one another;
    a skirt member circumscribing one of said coupling members for defining a wire receiving recess around said one coupling member;
    a plurality of flexible electrical wire means, each of which has first and second end portions which are mounted on said first and second tubular coupling members, respectively, and a slack portion disposed within said recess, and
    means for retaining said slack portion of each of the electrical wire means in said recess,
    wherein said slack portions are extended into and retracted out of said recess as said coupling members are rotated relative to one another in first and second directions, respectively.

12. The rotary coupling defined in claim 11, wherein said retaining means includes a retaining ring for retaining said slack portion of each wire means within said recess, and at least one spring means for resiliently urging said ring against each said slack portion.

13. The rotary coupling defined in claim 11, wherein said skirt member includes a free edge, and a spacing grommet means around said edge for both uniformly spacing and mounting said electrical wire means around said edge.

14. The rotary coupling defined in claim 13, wherein each of said flexible electrical wire means includes first and second end portions, and wherein said rotary coupling further comprises first and second spacing ring means circumscribing said first and second coupling members, and connected to the first and second end portions of the flexible electrical wire means for uniformly spacing said wire means around the outer surface of said first and second coupling members.

15. The rotary coupling defined in claim 14, wherein said spacing grommet and one of said spacing ring means maintain the slack portions of said electrical wire means in mutually parallel relationship when said coupling members are rotated relative to one another.

16. The rotary coupling defined in claim 12, wherein said retaining ring is formed from an insulating material.

17. The rotary coupling defined in claim 12, wherein said retaining ring is coated with a selflubricating plastic material to minimize friction between said flexible electrical wire means and said ring.

18. The rotary coupling defined in claim 12, wherein said retaining ring includes at least one lug means formed from an insulating material for connecting said ring to one end of said spring means.

19. The rotary coupling defined in claim 12, wherein said spring means applies a retaining force to each of said electrical wire means through said retaining ring that amounts to no more than 3 ounces.

20. The rotary coupling defined in claim 11, wherein said first tubular coupling member transmits torque, and said second coupling member is concentrically disposed around said first tubular coupling member and serves to prevent said slack portion of each of said electrical wire means from engaging said first tubular coupling member when said first and second coupling members move relative to each other.

21. A rotary coupling for allowing rotational movement across a plurality of electrical wire means while applying a minimum of stress on said wire means, comprising:
first and second elongated tubular coupling members, wherein said first coupling member is concentrically disposed within and rotatable with respect to said second coupling member;
a skirt member circumscribing said second coupling member, such that the inner surface of said skirt member and the outer surface of said second coupling member define a wire receiving recess, and
a plurality of flexible electrical wire means traversing said first and second tubular coupling members along their longitudinal axes, wherein each said wire means includes a slack portion disposed in said wire receiving recess,
wherein said slack portions are extended into and retracted out of said recess as said coupling members are rotated relative to one another in first and second directions, respectively.

22. The rotary coupling defined in claim 21, wherein said first tubular coupling member transmits torque and said second coupling member prevents the slack portion of each electrical wire means from engaging said first tubular coupling member when said first coupling member is rotated relative to said second coupling member.

23. The rotary coupling defined in claim 21, wherein said skirt member includes a free edge, and spacing means around its free edge for uniformly spacing and mounting said electrical wire means therearound.

24. The rotary coupling defined in claim 21, wherein said second tubular coupling member is circumscribed by a spacing ring means for uniformly spacing and mounting said slack portions of said wire means around said second tubular coupling member.

25. The rotary coupling defined in claim 21, wherein said first tubular coupling member is circumscribed by a spacing ring means for uniformly spacing and mounting one end of each of said electrical wire means around said first tubular coupling member.

26. The rotary coupling defined in claim 21, further comprising a retaining means for retaining each of said slack portions into said recess.

27. The rotary coupling defined in claim 26, wherein said retaining means includes a retaining ring for retaining said slack portion of each wire means within said recess, and at least one spring means for resiliently urging said ring against each said slack portion.

28. The rotary coupling defined in claim 27, wherein said retaining ring is formed from an insulating material, and wherein said retaining ring is coated with a layer of self-lubricating plastic material to minimize friction between said flexible electrical wire means and said ring.

29. The rotary coupling defined in claim 28, wherein each of said wire means is coated with a layer of self-lubricating insulating material for both electrically insulating said wire means and for minimizing friction between the slack portion of each of said wire means and said retaining ring.

30. The rotary coupling defined in claim 27, wherein said spring means applies a retaining force to each of said electrical wire means through said retaining ring that amounts to no more than 3 ounces.

* * * * *